Dec. 29, 1953   J. A. DOREMUS ET AL   2,664,554
REMOTE-CONTROL AND SUPERVISORY CONTROL SYSTEM
Filed April 19, 1951   4 Sheets-Sheet 2

FIG. 2

INVENTORS
John A. Doremus
BY   Herbert C. Waterman

Foorman L. Mueller

Atty.

Patented Dec. 29, 1953

2,664,554

UNITED STATES PATENT OFFICE 2,664,554

REMOTE-CONTROL AND SUPERVISORY CONTROL SYSTEM

John A. Doremus and Herbert C. Waterman, Chicago, Ill., assignors to Motorola, Inc., Chicago, Ill., a corporation of Illinois Application April 19, 1951, Serial No. 221,916

20 Claims. (Cl. 340—163)

This invention relates generally to supervisory control systems, and more particularly to a supervisory control system in which equipment at a remote station is controlled at a central station and indications are automatically provided at the central station showing the actual condition of operation of the equipment at the remote station.

There are many applications in which it is desired to control equipment which must be located at a given point from a central control station which may be remote from the given point. For example, in a power system it may be desirable to control motors, circuit breakers, valves or any other similar equipment from a central control station. For the operator at the central station to have complete control over the equipment at the remote station it is necessary that the operator know at all times the condition of the remote equipment. That is, he should know that the equipment has responded to the controls initiated at the central station and also whether the equipment has changed condition because of automatic controls or controls actuated at the remote station. Considering for example an automatic circuit breaker, the operator at the central station must be advised when the circuit breaker opens automatically due to an overload.

In order to simplify this equipment, it is desired that the control of the remote equipment from the central station be arranged to require a minimum of equipment at the stations and preferably require only a single channel for the interconnections between the two stations. It is also desired that the equipment be so constructed that mistakes in the operation thereof be minimized. By the use of signals of different characteristics, it is possible to transmit a large number of different control signals over a single channel. Similarly, it is desired to transmit signals indicating the condition of the remote equipment to the central station by use of equipment which is simple and inexpensive. Such signals may also have distinguishing characteristics and thereby a plurality of different signals may be transmitted over a single channel. However, a difficulty arises in this instance in that a plurality of operations may take place at the remote station simultaneously and if the control signals are transmitted simultaneously over a single channel the signals might interfere with each other and no clear indication of what had taken place would be received at the central control station.

It is therefore an object of the present invention to provide an improved supervisory control system for controlling remote equipment from a central station and indicating the condition of the remote equipment at the central station.

Another object of this invention is the provision of a relatively simple system for controlling remote equipment including provisions which prevent transmission of signals having different characteristics over a single channel and which prevents improper operation because of interference between the different signals.

A further object of this invention is to provide a supervisory control system in which equipment at a remote station is controlled from a central station and indications are provided at the central station showing the condition of the equipment at the remote station and automatically indicating any change in condition whether such change results from a control operated at the central station or from any other cause whatever.

A still further object of this invention is to provide a system which automatically transmits signals initiated from a plurality of sources in a predetermined sequence so that signals may be initiated by a plurality of sources at the same time or about the same time and are then transmitted in sequence over a single channel.

A feature of this invention is the provision of a supervisory control system by which equipment at a remote station is controlled from a central station by signals having different characteristics which are transmitted in sequence over a single channel, and which includes indicating equipment at the central station operated by signals transmitted from the remote station which also have different characteristics to selectively indicate the condition of the equipment at the remote station.

A further feature of this invention is the provision of a system for transmitting signals indicating the condition of a plurality of items of equipment which may change their operating condition at any time and a number of which may change their operating condition at substantially the same time, with the signals being transmitted automatically and in a predetermined sequence when a change takes place.

A still further feature of this invention is the provision of a remote indicating system for indicating the condition of a plurality of items of equipment and which includes relays associated with each item of equipment which are individually operated when the condition of the associated item changes its operating condition, and a selector switch coupled to the equipment and to tone generators to transmit tones indicating the condition of the equipment which have changed operating condition in a predetermined sequence. A circuit is provided which causes the selector switch to operate automatically when any relay is operated and to continue to operate to transmit tones indicating the condition of any equipment associated with a relay which is operated until indications have been transmitted for all equipment which has changed its operating condition.

Further objects and features and the attending advantages of the invention will be apparent from a consideration of the following description when taken in connection with the accompanying drawings in which.

In practicing the invention there is provided a supervisory control system by which an operator at a central station can control equipment at a remote station with the system including means for indicating at the central station the condition of operation of the remote equipment. The central station may include a control panel for applying individual control signals having different characteristics to a communication channel coupled to the remote station to selectively control the equipment at the remote station. The central station equipment is arranged so that the control signals cannot be transmitted simultaneously to interfere with each other. At the remote station, selector means are provided for operating various circuits in response to the signals received. These circuits may be used to control various equipment such as circuit breakers, motors, valves and the like operating at the remote station. In order to indicate at the central station the condition of the equipment being controlled, circuits are provided including members responsive to actual condition of operation of the various items of equipment, and a transmitting system is provided for transmitting signals to the central station indicating the condition of the equipment. As an example, the equipment may include a motor, and by the provision of a centrifugal switch on the motor, a circuit may be closed when the motor is operating and opened while the motor is at rest. By indicating the condition of this circuit, a positive indication is given as to the condition of the motor. The equipment operates automatically to give the indication when any change in condition of the equipment takes place as by controls initiated at the central station or by any other cause. That is, the equipment at the remote station may be subject to control at both the central and remote stations, and may also be subject to automatic control such as is the case of a circuit breaker which may be thrown open by an overload. The indication may be such to identify the origin of the initiating operation. The transmitting system operates to send the signals indicating the condition of the equipment in sequence so that in the event the operating condition of a plurality of equipments changes at the same time or about the same time, the signals indicating the condition will not be superimposed but will be sent separately.

Figure 1:
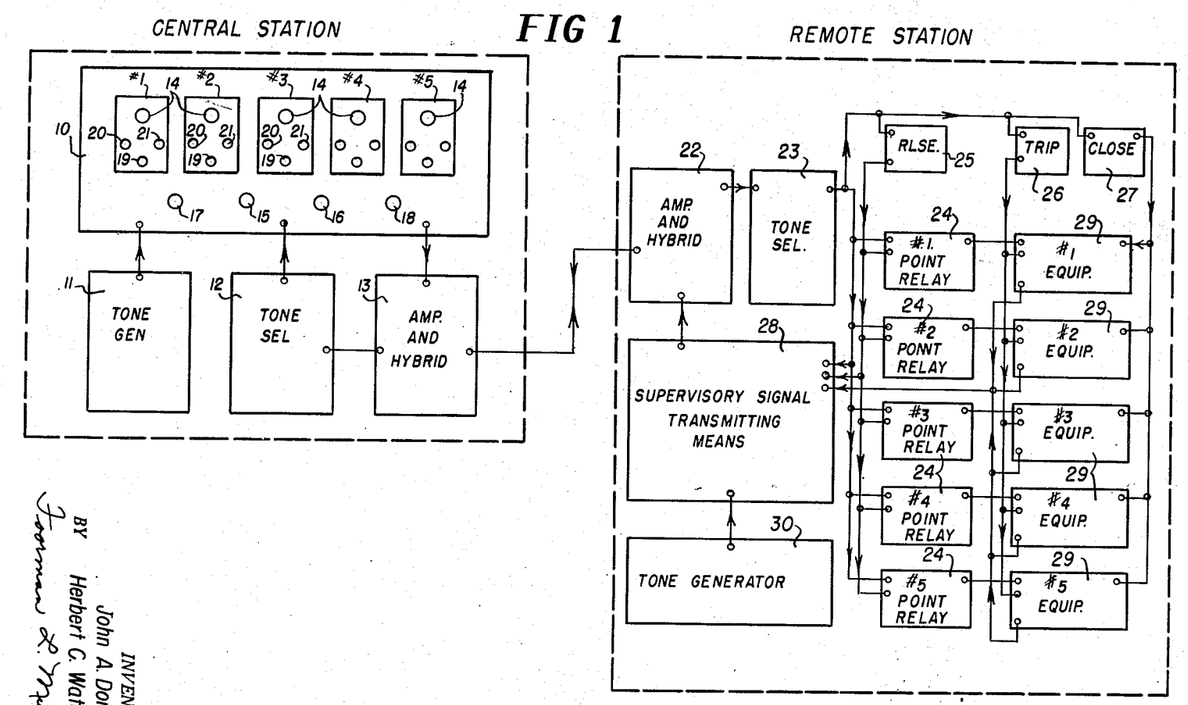
Fig. 1 illustrates the control system in block diagram form.

Referring now to the drawings, in Fig. 1 there is illustrated in block diagram form the complete supervisory control system positioned at the central station and at the remote station. The central station equipment includes the control panel 10, the tone generator 11, the tone selector 12 and an amplifier and hybrid unit 13. The control panel includes a plurality of keys or switches 14 individually associated with items of equipment at the remote station for selecting the various items for controlling the same. In Fig. 1 switches for controlling items numbered 1 to 5 are shown. Keys or switches 15, 16, 17 and 18 are provided through which various operations of the remote equipment are provided by use of tones transmitted to the remote station. Although a system is described in which signals of different frequencies or tones are transmitted to provide selective operation, it is obvious that signals differing in other respects can be used in the same way. The switches 15 and 16 are for controlling the equipment between two conditions indicated, trip and close, and the switch 17 is for releasing the controlled equipment after the desired control has been performed. Switch 18 is for causing the equipment at the remote station which sends back the indication, to scan all of the items of equipment and check the condition thereof at any desired time.

The control panel also includes a plurality of indicating lamps identified as 19, 20 and 21 which indicate the condition of the equipment controlled. The lamps 19, 20 and 21 are associated with the individual items of equipment as are the switches 14, with the lamp 19 indicating when the equipment has been selected for control and the lamps 20 and 21 indicating the condition of operation of the equipment. The lamps are controlled by the tone selector equipment 12 to which tones of different frequencies are applied from the remote station and which operates to energize the lamp selectively depending upon the tones received.

At the remote station, communication is provided with the central station through the amplifier and hybrid unit 22. The signal received by the unit 22 from the central station is applied to the tone selector 23 which produces various control voltages depending upon the signals received. These control voltages are applied to the point relays 24 which are individually associated with the various items of equipment numbered 1 to 5 inclusive. Control voltages from the tone selector are also applied to the release circuit 25, the trip circuit 26, the close circuit 27 and to the supervisory signal transmitting means 28. The release circuit 25 is connected to the various point relays 24 and to the supervisory signal transmitting means 28 for releasing the same when a particular signal is transmitted to the remote station from the central station. The trip and close circuits 26 and 27 are connected to the various items of equipment 29 to cause operation thereat when these equipments are selected by the point relays 24. These equipments are individually coupled to the supervisory signal transmitting means 28 for causing operation thereof to transmit signals indicating the condition of these items when there is a change of condition or when the supervisory signal transmitting means is caused to scan all of the equipments. Signals are continuously provided by the tone generator 30 to the supervisory signal transmitting means so that signals of various characteristics may be selected and transmitted thereby to the amplifier and hybrid unit 22 from which they are applied to the amplifier and hybrid unit 13 at the central station.

Figure 2:
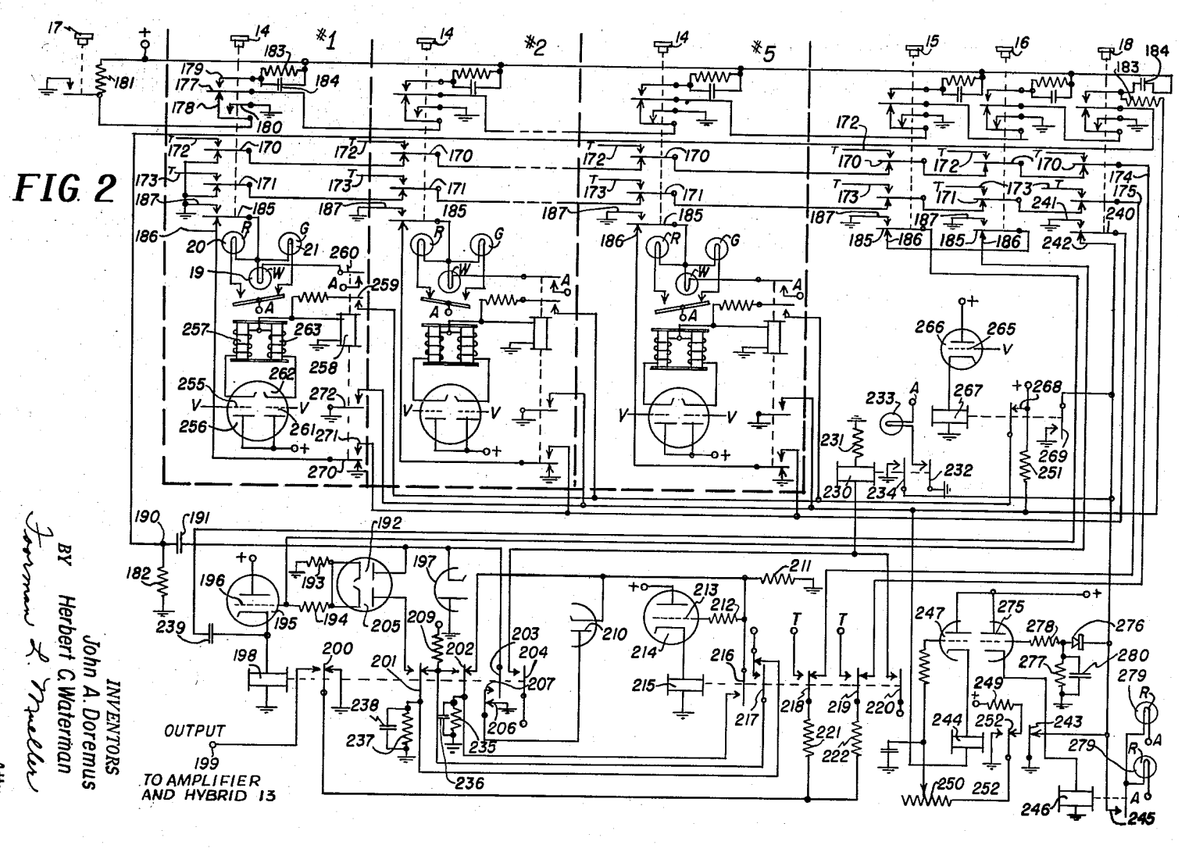
Fig. 2 illustrates the equipment provided at the central station.

The tones applied by the transmitting equipment through the amplifier and hybrid 22 to the central station are received by the amplifier and hybrid 13 and applied to the tone selector 12 which provides selective controls in response to the particular signals received. Selective controls in the tone selector 12 operate to energize the various indicating lamps on the control panel. In Fig. 2 there is shown the circuit at the central station including the operating keys and the arrangement for providing the desired interlocking relation between the various indicating lamps. The same reference numerals are used as in Fig. 1 for corresponding parts, and only the portion of the unit required for the Nos. 1, 2 and 3 equipments are shown to simplify the disclosure.

The switches 14 associated with the various equipments have pull type operating members which may be pulled out and allowed to remain in the actuated position. These switches include a relatively large number of movable contacts, including contacts 170 and 171 which are effective to make connection to contacts 172 and 173 respectively when a switch is pulled out. The contacts 172 and 173, labelled T are connected to the tone generator, and the tones therefrom are applied through contacts 170 and 171 to the conductors 174 and 175, from which they are transmitted as will be further explained. Back contacts are provided which are engaged by the contacts 170 and 171 when the switches are in their normal position so that the circuits are held continuous through the various switches. Each of the switches 14 also includes a set of contacts for controlling the circuit for transmitting the tones. These include a main movable contact 177 normally engaging a contact 178 and engaging the contact 179 when the switch is pulled out. The contact 178 engages the contact 180 as the switch is pulled out to provide momentary connection between 177 and 180 for grounding the contact 177. A further set of contacts is provided on each switch 14 for controlling the indicating lamps. The contact 185 normally engages a fixed contact 186 connected in a circuit to be explained more in detail and when the switch is operated the movable contact 185 is connected to the contact 187 connected to ground.

The switches 15, 16 and 18 for controlling the trip, close the scan operations, may be substantially identical to the switches 14 for the various points associated with items of equipment. The switches 15 and 16 for trip and close operation are spring biased and must be held operative for an interval long enough to transmit the desired tones. The switch 18, like the switches 14, is not spring biased and will remain in operated condition until physically moved to the normal position. These switches include contacts for connecting to the tones T from the tone generator and for providing the control operations for transmitting the tones. The release switch 17 may be of very simple construction since it includes only a single contact which is normally open and which is closed when the switch is actuated. This switch is also spring biased and therefore automatically returns to the normal position when released.

The circuit for transmitting the tones includes the resistor 182 across which a voltage is developed to charge the condenser 191. In the normal condition the resistors 181, 182 form a voltage divider which applies a voltage to the point 190. When using a plus potential of 125 volts and resistors 181 and 182 of equal value the potential of point 190 will be about 60 volts. This voltage charges condenser 191 which is connected in series with diode 192 and resistor 193. Any voltage across the resistor 193 is applied through resistor 194 to the control grid 196 of the triode 195.

Now when the release switch or key 17 is operated, the point 190 will be grounded through the contacts of the release switch. This will cause the condenser 191 to be discharged through the diode 197. When the release key 17 is released so that the ground is removed, 60 volts will again be applied to terminal 190 so that the condenser 191 will charge through resistor 193 providing a voltage pulse on the control grid 196 of triode 195 rendering the triode conducting so that the relay 198 will be operated. This causes all the movable contacts 200, 201, 202, 203 and 204 to move to the left. The movable contact 200 operates to apply the tones to the output terminal 199 which is connected to the amplifier and hybrid 13 of Fig. 1. The contact 201 closes a holding circuit for the triode 195, through the diode 205, and through further relay contacts to be explained hereinafter. The movable contact 203 cooperates with the contacts 206 and 207 to momentarily ground the condenser 191 and then to connect the condenser to the diode 210. Contact 202 charges the time constant circuit 235, 236 through resistor 209 as will be further explained.

The diode 210 is connected through resistor 211 to ground and through resistor 212 to the grid 213 of the triode 214. Since the momentary grounding of the condenser 191 does not completely charge the same, the voltage is applied through the diode 210 to the grid 213 of the triode 214 to render the same conducting. This energizes the relay 215 so that the movable contacts 216, 217, 218, 219 and 220 thereof are all moved to the left. The contact 216 provides a holding circuit for the triode 214 in the event that relay 198 is operated. That is, a holding circuit is provided from plus potential through resistor 209, contact 202, contact 216 and resistor 212 to the grid 213 of tube 214. The contact 217 charges the time constant circuit 237, 238 for the triode 195 through the same resistor 209. Contact 201, diode 205 and resistor 194 connect the grid 196 to the time constant circuit 237, 238. Contacts 218 and 219 when in the left position are connected to tones from the tone generator which are used to indicate release. After the time constant circuit 237, 238 discharges, triode 195 no longer conducts, releasing relay 198. This allows time constant circuit 235, 236 to discharge, and after its discharge triode 214 no longer conducts, releasing relay 215. During the discharge time of 235, 236, that is while relay 215 is picked up but relay 198 has dropped out, no tone signal can be sent out. This provides a guard time between successive tone signals which is necessary to prevent improper operation of tone selector equipment 23.

In the unoperated position of the relay 215, contacts 218 and 219 are connected to the conductors 174 and 175 which apply the tones from the various selector switches. The tones from the contacts 218 and 219 are applied through resistors 221 and 222 to the contact 200 of relay 198 and applied to the output terminal 199 when the relay 198 is actuated. Contacts 204 of relay 198 and contact 220 of relay 215 are connected in parallel so that when either of the relays 198 and 215 are operated a slow-to-release relay 230 is connected to plus potential through resistor 231, so that this relay is energized. This relay includes contact 232 for energizing the lamp 233 which shows when the system is busy, and a contact 234 the function of which will be described hereinafter.

The operation of the system was described when the release switch 17 is operated and under such condition the voltage of point 190 is relatively high so that the charge time of condenser 191 is long enough to cause the tube 195 to conduct and subsequently cause the tube 214 to conduct. Therefore the contacts 218 and 219 will be operated to select the release tones which will be applied to the output terminal 199 through contact 200 of the relay 198. In the event that one of the switches 14 for selecting an item of equipment or one of the switches indicating trip or close, is operated, plus B will be connected to the point 190 through the parallel connection of resistor 183 and condenser 184. The resistor 183 keeps the condenser normally discharged. When the connection is made, a relatively high potential will be applied to point 190 instantaneously, but as the condenser 184 charges the voltage of point 190 will very rapidly be reduced. In such case the voltage pulse across resistor 182 will be relatively short, and after tube 195 is rendered conducting thereby, the charge will be substantially completed by the action of the momentary contact 206 so that the tube 214 will not be rendered conducting. Therefore the tones will be applied from conductors 174 and 175 through switch contacts 218 and 219 to the contact 200 of relay 198 and will be applied to the output terminal 199. That is, the tones T selected by the contacts 170 and 171 of the particular switch operated will be transmitted. Time constant circuit 237, 238, previously charged through resistor 209, will keep relay 198 energized for a predetermined time to provide proper signal tone timing. As the tone selector requires a certain amount of time to operate, it is desired to prevent transmission of a second pair of tones before the operation of the first set of tones has been completed. Such action is provided through the contact 202 of the relay 198 which is connected to resistor 235 in parallel with condenser 236. When the relay 198 is operated the contact 202 connects the condenser 236 to plus potential through resistor 209. The condenser therefore becomes charged so that when the relay drops out the voltage across the condenser is applied to the conductor which is connected through resistor 212 to the grid 213 of the tube 214. This renders the tube 214 conducting for a predetermined time. This disconnects the lines 174 and 175 from the contacts 218 and 219 so that additional tones applied to the lines 174 and 175 from other switches which may have been operated will not be transmitted. In the event that a switch is operated to energize the relay 198 before the relay 215 has dropped out, the release tones will be applied to the contact 200 and transmitted to the output 199 to wipe out any action which has been started.

The switches 15 and 16 for trip and close operation include movable contacts 185 selectively connecting the condenser 239 to the tube 195. When the switches 15 and 16 are in their normal position, the condenser 239 is connected through contacts 185 of switches 15 and 16 between the grid and cathode of the tube 195. However, when either of the switches 15 or 16 is operated, the condenser 239 is connected between the cathode of tube 195 and ground. This will cause the condenser 239 to be charged by the voltage across the relay winding 198 so that the plate of the condenser connected to the cathode will be positive. As previously stated, the switches 15 and 16 are spring biased so that they will return as soon as released by the operator. As soon as the switches are released, the tones will no longer be connected to the conductors 174 and 175 through the contacts 170 and 171 of the switches. It is therefore desired that the tube 195 be rendered conducting to transmit tones only as long as one of the switches 15 and 16 is actually operated. Accordingly, while the switch 15 or 16 is operated the condenser 239 will be charged and then when the switch is released the condenser will again be connected to the grid 196. This results in a voltage being applied to the grid which is negative with respect to the cathode so that the tube is immediately blocked. Therefore the circuit through the contacts 185 of switches 15 and 16 and including the condenser 239 operates to release the relay 198 which stops transmission of the tones as soon as the switch 15 or 16 is released.

The circuit of the scan switch 18 is slightly different from that of the other switches previously described with the condenser 184 connected to the contact 179 being connected to plus potential, and the resistor 183 connected to the contact 179 being connected through resistor 251 to plus potential. The resistor 183, however, may be grounded through the contact 272 of the relay 258 so that the condenser 184 will charge from plus potential through resistor 183. This charging takes place only when one of the relays 258 is operated. When the condenser 184 is charged, operation of the scan switch will not result in the transmission of the scan tones since the condenser will hold the point 190 at such a low potential that the tube 195 will not be rendered conducting. This results in an interlocking arrangement which prevents initiation of the scanning operation when one of the relays 258 is operated. Therefore, it is necessary that the system be released before the scan operation can take place. After the system is released, the condenser 184 will be held discharged by the resistor 183 and the resistor 251, so that actuation of the scanning switch will cause operation of the equipment to transmit the scanning tones which will be applied through the contacts 170 and 171 of the scanning switch 18.

When tones are applied from the remote station to the tone selector 12 indicating that the equipment number 1 is in tripped condition, a voltage will be applied from the tone selector to the grid 255 of the triode section 256. This will cause the triode section 256 to conduct so that the winding 257 is energized connecting the lamp 21 to the alternating voltage source A which will energize the same. The contacts associated with coils 257 and 263 are of the mechanical latching type, and the contact pair associated with the last energized coil will remain closed until the opposite coil is energized. This current will also flow through the winding 258 of another relay causing the contacts 259 and 260 to be closed. The contacts 260 will energize the lamp 19 by connecting the same to the alternating source A. The contact 259 provides a holding circuit for the relay 258 so that the lamp 19 remains illuminated. In the event that the tone signal received from the remote station indicates that the circuit breaker 40 is closed this tone will operate through the tone selector to provide a voltage on the grid 261 of the triode section 262. The triode will then conduct and the current will flow through the winding 263 to connect the lamp 20 to source A to illuminate the same indicating that the circuit breaker is closed. The lamp 21 will be extinguished since the contacts associated with winding 257 are opened through the mechanical interlocking arrangement. The lamp 19 however will remain energized because of the holding circuit of relay 258 which would be energized by action of the triode section 262 in any event since current from this section also flows through the relay winding 258 to operate the same.

When the release tones are applied by the remote transmitting equipment, the tone selector 12 will apply a voltage to the grid 265 of triode section 266 causing this triode to conduct to energize the relay 267. This relay includes contacts 268 which are normally closed to apply plus potential to the contact 259 for the holding circuit of relay 258. When the relay operates, the contacts 268 open to break the holding circuit for the winding 258. The operation produced by the release signal therefore extinguishes the lamp 19 but allows either the lamp 20 or 21, whichever is operating, to remain in that condition. The interlocking arrangement of the lamp 21 and 22 causes one of these lamps to be energized at all times.

In order to provide an indication as to whether a change in the condition of the remote equipment results from a control operation at the central station, or from automatic operations which may take place at the remote stations, an arrangement is provided for causing the lights to flash on and off when the change results from a remote operation whereas the lights will be on steady in the event that the operation was initiated at the central station. This arrangement operates through the ground connections to the lamps 19, 20 and 21. Considering the circuit associated with the No. 1 equipment, the contact 187 of the switch 14 provides a steady ground to the contact 185 when the switch 14 is actuated. When the switch is not actuated the contact 186 makes connections to the contact 270 of the relay 258. When the relay 258 is not actuated, the contact 270 is grounded to apply steady ground to the lamps 19, 20 and 21. However, when the relay 258 is actuated, contact 270 is connected to contact 271 which is in turn connected to contact 240 of the scan switch 18. When the scan switch has been operated contact 240 engages the contact 241 which is grounded so that a steady ground is applied to the lamps through this contact. However, when the scan switch is not operated the contact 240 engages the contact 242 which is connected to the contact 269 of relay 267, to the contact 234 of relay 230, to the contact 243 of relay 244, and to the contact 245 of relay 246. The contact 269 of relay 267 provides steady ground to the indicating lamps 19, 20 and 21 when the release tones are received and the relay 267 is operated and the contact 234 provides steady ground when either of the tubes 195 or 214 is operated while tones are being transmitted.

The relay 244 is connected to the cathode of tube 247 and through resistor 251 to plus B. The grid of the tube 247 is connected to a positive potential through resistors 249 and 250, but the tube is normally non-conducting due to the positive potential at the cathode. The relay 244, however, is grounded by the contact 272 when any one of the relays 258 is actuated. Therefore, the tube 247 will conduct when one of the relays 258 is operated. Therefore, when a steady ground is not applied to the lamps by one of the previously mentioned connections, the tube 247 will conduct when one of the relays 258 is operated. When the tube 247 conducts, the relay 244 will operate and the contact 252 thereof will break the grid circuit to the triode 247 so that the tube will be blocked and the relay will drop out. The circuit to the grid will then be completed again so that the relay 244 will intermittently operate and ground will be intermittently applied through the contacts 243 to the lamps.

In order to provide an alarm which may indicate to the operator that something had happened which has been initiated at the remote station, an alarm circuit is provided including the triode 275 in the output circuit of which is the relay 246. When a steady ground is not applied to the lamps by one of the previously mentioned connections, an intermittent potential is applied through the lamps 19, 20 and 21 whenever contact 243 is opened and is rectified by the rectifier 276 to supply a positive voltage across R-C filter 277, 280, the time constant of which is long enough to maintain tube 275 conducting during the periods of closing of contacts 243. This voltage is applied through resistor 278 to the grid of the triode 275 to cause this triode to conduct and the relay 246 to operate. Therefore the contacts 245 will remain closed to energize the lamps 279. It is obvious that other alarm devices than the lamps 279 may be used if desired.

Therefore, when any one of the switches 14 is operated to provide a control operation, a steady ground connection will be provided to the lights, and after the points are released a steady ground will also be provided. This steady ground will be held continuous through the relay 230 as long as any signal is being transmitted. Further, a steady ground is provided by the scan switch when the scanning operation takes place. However, when operations take place at the remote station causing tones to be transmitted to the central station which will operate one of the relays 258, and in the event that none of the switches are operated at the central controls, an intermittent ground will be provided through the relay 244. Thus flashing of the lights as well as operation of the alarm circuit will take place.

Figure 3:
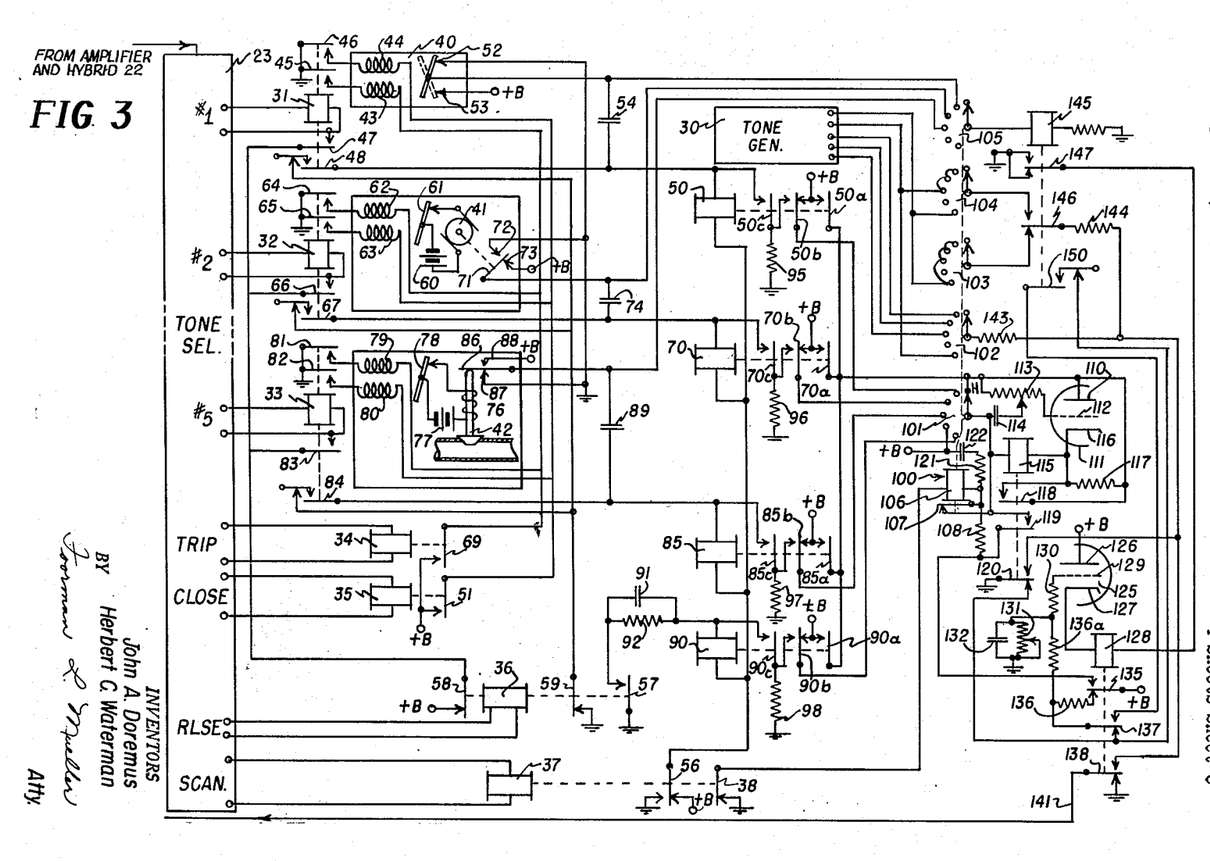
Fig. 3 illustrates the equipment provided at a remote station.

In Fig. 3 there is illustrated the equipment required at the remote station for controlling the equipment thereat and also for transmitting signals back to the central station to indicate the condition of the remote equipment. The control signals from the central station are applied to the tone selector 23 which selectively provides closed circuits in response to tones of particular frequencies. The tone selector serves to provide energizing voltages at the remote station which correspond to the circuits closed by the switches 14 to 18 of Fig. 1 at the central station. That is, when equipment No. 1, 2 or 5 is selected, the tone selector operates to apply a voltage to one of the relays 31, 32 or 33. Operation of the trip and close switches at the central station causes energization of the relays 34 and 35 respectively. Operation of the release switch at the central station causes operation of the release relay 36 at the remote station and correspondingly operation of the scan switch 18 at the central station causes operation of the scan relay 37 at the remote station. It is therefore apparent that the tone selector serves to provide operations at the remote station which correspond to the switches in the control panel at the central station.

In the remote station system of Fig. 3, the equipment No. 1 is illustrated as a circuit breaker identified generally as 40. The equipment No. 2 is the motor 41 and the equipment No. 5 is the valve 42. It is to be pointed out that these items are merely illustrative and various other equipment can be controlled in an entirely analogous manner. It is also to be noted that a much larger number of different items of equipment can be controlled.

Considering first the circuit breaker 40, this equipment includes windings 43 and 44 for causing the breaker to trip and close respectively. These windings may be selectively connected to ground through the contacts 45 and 46 respectively of the relay 31. The relay 31 also includes contacts 47 which establish a holding circuit for the relay and momentarily closing contacts 48 which serve to operate the relay 50 momentarily whenever the relay 31 either opens or closes. As will be more fully explained, the relay 50 will operate to cause a signal to be transmitted to the central station indicating the condition of the equipment No. 1. When the No. 1 equipment, the circuit breaker in this case, has been so selected at the central station, the operator may then change the operating condition of the circuit breaker. That is, if the circuit breaker 40 is tripped, the operator may operate switch 16 at the control panel to thereby cause operation of the relay 35 at the remote station to close the circuit breaker. It is apparent from Fig. 3 that operation of the relay 35 causes the contact 51 thereof to be connected to plus B and this energizes the winding 44 of the breaker so that the arm thereof moves to the closed position which is shown in dotted line.

Change in condition of the circuit breaker operates through the contacts 52 and 53 to disconnect the condenser 54 from ground, through which it was connected by contact 52, to plus B through contact 53. With the circuit as shown the condenser 54 is connected across plus B and ground and will therefore be charged to the plus B voltage. This connection is provided through the contact 52 to ground, and through the winding of the relay 50 and the contact 56 of the relay 37 to plus B. Now when the contact 52 is opened and the contact 53 is closed, the condenser 54 is connected to plus B at both terminals so the condenser will discharge. This discharge current flows through the winding of the relay 50 and causes the relay to operate. If the contact 52 is thereafter made, the condenser 54 will again be charged by plus B and the charging current will cause the relay 50 to operate. As will be explained more fully when the relay 50 operates it causes the transmitting system to transmit tones indicating the condition of the equipment associated with the relay. The condition of the circuit breaker is therefore continually indicated at the central station, with the indication closely following all changes in condition so that the operator can check to see that the desired control has actually been performed.

When no further control of the circuit breaker 40 is required, the release switch will be closed at the central station causing the release relay 36 to operate. This causes the contact 58 thereof to be disengaged from plus B to release the holding circuits for the relay 31, and also causes the contact 59 to be disengaged from ground to open the circuits through the momentary contacts 48 of the relay 31 so that these contacts will not actuate the relay 50 when the relay 31 is released. The relay 36 also includes contacts 57 which initiate operation of the transmitting equipment to send out release tones as will be more fully described.

The No. 2 equipment is represented as the motor 41 which is operated by a voltage source 60 through switch 61. The switch 61 is controlled by the windings 62 and 63 which are connected to the contact 64 and 65 of the relay 32. Therefore when the No. 2 equipment is selected and the relay 32 operated, the contact 64 and 65 will close to connect one terminal of the windings 62 and 63 to ground. The relay 32 also includes contacts 66 for establishing a holding circuit for the relay and momentarily closing contact 67 for energizing the winding of the relay 70 which controls the transmitting equipment. The operator can therefore by closing the switch 2 at the control station cause the relay 32 to operate to ground one side of the windings 62 and 63 to thereby select the motor 41. The equipment at the remote station will then operate to send out a tone to the central station showing the condition of the motor 41 at the time it is selected. The motor is shown with the energizing circuit thereof closed so that the motor will be running. This condition will be indicated to the operator through the control panel.

When the operator decides to stop the motor 41 he will operate the trip switch 16 which will energize the trip relay 34 and connect the winding 62 to plus B. This will cause the switch 61 to open to stop the motor 41. For indicating the condition of the motor, there may be provided a centrifugal switch having a movable contact 71 which may be connected through contact 72 to ground or through contact 73 to plus B. The movable contact 71 is connected through condenser 74 to the winding of the relay 70, so that change in position of the movable contact 71 causes one terminal of the condenser 74 to be shifted from ground to plus B, or vice versa. This will cause the condenser 74 to be either charged or discharged, and the current therethrough will flow through the winding 70 of the relay to operate the same. Therefore, after the operator has changed the condition of the motor 41 the relay 70 will again operate to transmit signals which indicate on the control panel at the central station the condition of the motor. If the operator desires to provide no further control of the motor he will then operate the release key 18 causing operation of the release solenoid 36 which will operate to break contacts 58 and 59 to release the holding circuit of the relay 32 and prevent operation of the point relay 70 as the relay 32 closes as previously set forth. The contacts 57 will close to cause the release tones to be transmitted from the remote station to the central station.

The equipment No. 5 at the remote station is indicated as a valve 42. The valve is controlled by a solenoid 76 energized by voltage source 77 through switch 78. The switch 78 is controlled by the windings 79 and 80 which have one terminal thereof connected to the contacts 81 and 82 of the relay 33. The relay 33 also includes contacts 83 which provide a holding circuit therefor and momentarily closing contacts 84 for energizing the relay 85 which operates the transmitting system for sending tones to the central station when the No. 5 equipment, or valve 42 is selected. After the operator has closed the switch selecting the No. 5 equipment he may change the condition of this equipment by operation of either the trip or close switch. As shown in Fig. 3, the valve 42 is shut, and to open the valve the operator may actuate the trip key which energizes the solenoid 34 and connects the winding 79 to plus B through the contact 69.

Opening of the valve 42 will cause actuation of the switch connected thereto so that the moving contact 86 will move away from the contact 87 and will engage the contact 88. The contact 87 is connected to ground and the contact 88 is connected to plus B. The movable contact 86 is connected to one terminal of the condenser 89 so that this terminal is shifted from ground to plus B or vice versa when the moving contact 86 changes from one position to the other. As in the previous circuits, this will cause the condenser 89 to either charge or discharge and the current therefrom will flow through the winding of the relay 85 to actuate the same. The relay 85 will therefore initiate operation of the transmitting equipment so that signals will be transmitting indicating the condition of the valve 42 so that the operator at the remote station can determine whether the desired operation has been performed. After operations on the valve 42 have been performed, the operator can actuate the release key 16 to cause the relay 36 to be energized and thereby release the holding circuit for the relay 33. The relay 36 also causes the contact 59 and 57 to be operated to perform the functions previously stated.

As previously stated, the contact 57 of the release relay 36 at the remote station operates to transmit tone signals to the central station indicating that the equipment operated has been released. The contact 57 closes a circuit through relay 90 and the contact 56 of relay 37 for energizing the relay 90. The circuit is completed through the parallel circuit including condenser 91 and its discharging resistor 92 which are effective to cause the relay 90 to pick up momentarily and lock in through its own contacts 90c through resistor 98 to ground.

Considering now the transmitting system, which is automatically operated in response to operation of any one of the relays 50, 70, 85 and 90, this system includes a spring-driven stepping switch 100 having contact levels 101, 102, 103, 104 and 105. The stepping switch includes a spring, an energizing winding 106 which "cocks" the spring, and interrupter contacts 107 to open the cocking circuit when the spring is compressed. The spring itself drives the switch to the next position upon opening of contacts 107. This stepping switch may be of standard construction as is used in telephone applications and other selecting systems. The number of contacts required in each level will depend upon the number of items of equipment controlled and the general complexity of the system. It is possible to use any standard switch having at least as many contacts per level as the number of equipments controlled plus additional contacts for release and for a home position of the switch. As will be explained, switches having a larger number of contacts than necessary can be used and connections can be provided so that the unused contacts will be rapidly passed over in the operation of the system.

The operation of the stepping switch is controlled principally through the switch level 101, its own contacts 107, and holding circuits thru resistor 108 which hold it in the "cocked" position. Resistor 121 and condenser 122 provide spark suppression for contacts 107. The home contact of the level 101, marked "H" is connected to the contacts 50A, 70A, 85A and 90A of the relays 50, 70, 85 and 90 respectively. These contacts are normally open and are closed when the respective relays are closed to apply plus B potential to the home contact of the level 101. The number 1, 2, 3 and 5 contacts of the level 101 are connected to the relay contacts 50B, 70B, 85B and 90B of the relays 50, 70, 85 and 90 respectively and normally connect these contacts of level 101 to plus B. The relays 50, 70, 85 and 90 are called "point" relays as they provide the connection from the stepping switch to the various equipments or points. When any of the relays are operated, this connection to plus B is broken and the contacts are connected to ground through resistors 95, 96, 97 and 98 respectively. The relays 50, 70, 85 and 90 also have contacts 50C, 70C, 85C and 90C which are in holding circuits for holding the relays operated. Relays 50, 70, 85 and 90 are of the type having a shading coil and commonly described as the "A. C." type. Thus, even though the original current which picks up the relay may be in either direction (the current may be caused either by charge or discharge of a condenser through the relay winding) and the holding current is always in the same direction, the relay will not be prematurely dropped out because of possible current reversal between the pick-up and hold-in conditions.

The home contact on level 101 is connected to the plate 110 of a triode tube section 111. The grid 112 of the triode is also connected to the home terminal through resistor 113. The movable contact at level 101 is connected to an intermediate tap on the resistor 113 through condenser 114 and is connected through the winding of relay 115 to the cathode 116 of the triode. Relay 115 has a copper slug on its coil to cause drop out delay. Resistor 117 interconnects the plate 110 and the cathode 116 of the triode and may be shorted out by the contacts 118 of the relay 115. The relay 115 also includes contacts 119 and 120 for a purpose to be described later.

A second triode tube section 125 is provided which may be included in the same envelope with the triode section 111. The triode section 125 includes a plate 126 connected to plus B, a cathode 127 connected through relay winding 128 to ground and a grid 129 which is connected through resistor 130 and the parallel circuit including variable resistor 131 and condenser 132 to ground. The grid 129 is also connected to ground through resistor 130, resistor 136a and contacts 137 to the contact 120 of relay 115, and when the relay 115 operates, a connection is provided from plus B through the contact 135 of relay 128, resistors 136 and 136a and resistor 130 to the grid 129. This renders the triode section 125 conducting so that the relay 128 operates and removes the plus B connection from the grid 129 of the triode 125. Through this connection the condenser 132 has been charged from plus B so that the triode 125 remains conducting. The relay 128 also includes contact 137 and 138, the function of which will be described later.

The contacts 138 of relay 128 operate to connect tones supplied from the tone generator 39 to the conductor 141 which applies the tones to the central station. The connection of the tone generator with this conductor are made through the levels 102, 103 and 104 of the stepping switch. The connections are such that when the switch is in the position corresponding to the individual items of equipment, tones are connected to identify the equipment. That is, when the stepping switch is at contact 1, tones are transmitted which identify the circuit breaker 40. Similarly, when the stepping switch is at contact 2, tones are connected which represent the motor 41, and contact 3 connects tones representing the valve 42. The stepping switch is shown as having fourth contacts which are not used, with the contact 4 on level 101 being connected to plus B for reasons to be presently explained. The last contact on the stepping switch is associated with the release relay 90 for applying tones when the release operation has taken place. Contact 129 on relay 115 serves to ground the tone line, thus preventing tone output, whenever relay 115 is picked up.

Considering now the operation of the system, it will be assumed first that the relay 50 has been actuated. As previously described the relay 50 may be operated by operation of the No. 1 switch at the control panel by the operator through relay 31 and contacts 48 thereof, or through condenser 54 when there is a change. The contact 50a of relay 50 operates to provide plus B connection to the home contact of level 101, which is in turn applied through the interrupting contact 107 to the winding 106 of the stepping switch. This causes the stepping switch electromagnet 106 to mechanically "cock" the switch and, at the completion of the "cocking" action, open its own circuit 107. This de-energizes electromagnet 106 and allows the "cocked" spring to move the switch one step so that the movable contacts at all levels of the switch are positioned at contact number 1. Contact number 1 of level 101 is connected to contact 50b of relay 50, which is connected to resistor 95 in the holding circuit for the relay 50, when the relay 50 is actuated. There is a small voltage drop across the resistor 95 due to the circuit through the contact 56 of the relay 37 and the relay winding 50, but this voltage is not sufficient to energize the winding 106 of the stepping switch. The plate 110 of the triode 111 is also connected to B plus through the relay contacts 50a, and the cathode 116 is connected to a lower voltage since the movable contact at level 101 is connected only to the voltage applied across resistor 95. The triode is thus rendered conducting and the relay 115 in the cathode circuit thereof becomes actuated. As the contacts 118 of the relay 115 directly short the plate 110 to the cathode 116, the relay coil 115 is subjected to a higher current than would be possible if the triode 111 was allowed to remain in series. This is to insure sufficient flux for the slow release action, which will be described later. The relay 115 operates to close contacts 119 for a purpose to be described later.

The relay 115 operates through contacts 120 thereof to remove ground from contacts 137 thereby to provide a voltage to the grid 129 of the triode 125 through the connection from plus B through contact 135 of relay 128 and through resistors 136, 139, and 130, to render this tube 125 conducting. This causes the relay 128 to operate and this relay acts through the contacts 135 thereof to immediately remove the plus B potential from the grid circuit. However the condenser 132 in the grid circuit has become charged and holds the tube conducting for a predetermined interval depending upon the setting of the resistor 131 which tends to discharge the condenser 132. When the relay 128 is operated plus B is applied through contact 135, contact 119 and contacts 107 to electromagnet 106 of the stepping switch to "cock" the switch and after contacts 107 open, to hold it in the "cocked" position with current through resistor 108. Also, contacts 135 supply B+ through contacts 119 to the end of coil 115 which is not connected to contacts 118. This puts B+ on both ends of coil 115, allowing it to release, but only after its own drop-out delay. During the slow release time of relay 115 B+ is connected through contact 119 to the moving contact of level 101 and through the number 1 contact to the contact of 50b of the relay 50. As the contact 50b is connected through contact 50c to the winding of relay 50, when the relay is actuated, plus B is in effect applied to both terminals of the winding of the relay 50 and the winding is in effect shorted so that the relay 50 drops out and the holding circuit through contact 50c is broken.

While the relay 128 is operated, the contacts 138 close and after relay 115 drops out, the contacts 120 open, so that the tones applied to the terminals 1 of level 102, and either level 103 or 104, will be applied to conductor 141 through resistors 143 and 144. Whether or not the level 103 or 104 is connected depends upon the condition of relay 145. The relay 145 is selectively connected through the level 105 to the switches on the equipment indicating the condition of the equipment. Contact 1 of level 105 is connected to the switch on the circuit breaker and is connected either to plus B through the contact 53 or to ground through the contact 52. When the switch is in the tripped position as shown, the relay 145 is not operated as the winding thereof is grounded so that the contact 146 is connected to the level 103. However, when the circuit breaker is closed plus B will be applied from the contact 53 to the winding of the relay 145 to cause this relay to operate and the contact 146 thereof to make connection to the level 104. Therefore in the position shown the tone applied to the first contact of level 102, which is a common tone identifying the circuit breaker 40, and the tone applied to the contact 1 of level 3, which indicated that the circuit breaker is tripped, will be applied through relay contacts 138 to the conductor 141.

As previously stated, after the time relays 115 and 128 are simultaneously operated, the relay 50 which started the operation will be released, connecting plus B through contact 50b to contact 1 of level 101 and then to one of the contacts 107. Contacts 107 are held open, however, by current from plus B, contact 135, through resistor 108 to electromagnet 106 until relay 128 drops to its normal position. When contact 135 opens, the stepping switch will then be driven by the spring to the next contact which is contact 2. Contact 2 is connected to plus B through contact 70b of relay 70 so the switch will continue on through contact 3. Contact 3 is connected to plus B through contact 85b of relay 85 so that the stepping switch will again operate. Contact 4 of level 101 is connected directly to plus B since there is no equipment associated with this position. Therefore the stepping switch will continue to contact 5 which is the release contact. If the release key at the central station has not been operated to cause the relay 90 to be operated, the contact 90b of the relay will apply plus B to contact 5 of the level 101 so that the stepping switch will continue. The next contact on the stepping switch will be the home contact at which the switch will come to rest in the event none of the point relays are operated.

The various tones applied from the tone generator 30 to the contact of levels 102, 103 and 104 of the stepping switch must be selected so that each different condition of the various equipments provides a different tone combination. In the system shown, five different tones are used to provide different combinations for each condition which might occur. The number of tones required will of course depend upon the number of equipment controlled and the various controls required.

The relay 145 includes a set of momentarily closing contacts 150 which are connected through the contacts 137 of relay 128 to the condenser 132. The purpose of this circuit is to prevent improper operation of the system in the event that an item of equipment changes condition while the transmitting system is in the process of sending out tones indicating its condition that is, while relay 128 is picked up but after relay 115 has dropped out. During this time the point relay will again be picked up whenever the piece of equipment changes its position indicating switch. As previously stated, the tube 125 will remain conducting as long as the condenser 132 is charged to a predetermined value. The momentarily closing contacts 150 provide a connection from ground through contacts 120 to the condenser 132 through contacts 137 and current limiting resistor 136a to discharge the condenser 132 so that the triode 125 will stop conduction and drop out relay 128. To further insure relay 128 dropping out, its ground return is momentarily opened at contacts 147 when relay 145 operates. Therefore if one of the equipment changes condition while tones are being sent out to indicate its condition, these tones will be immediately stopped, the stepping switch will be moved on towards home position, and the tones indicating its new condition will be sent as the step switch comes around again in response to the point relay having been picked up. Thus the proper tones will be sent to cause the proper indication at the central station.

It will be apparent from the above description that when any of switches 14 or the switch 17 is operated at the central station, one of the point relays 50, 70, 85 or 90 at the remote station will be operated. If the equipment changes condition due to operation of the trip or close switches, or automatically, a point relay will be set up. In such case the position of the level 101 will be connected to plus B to start operation of the selector switch. The switch will continue until the contact on level 101 associated with the relay operated is reached at which point it will be held for a sufficient length of time so that the tones associated with the equipment may be transmitted to indicate the condition of the equipment. The switch will then continue to the home position at which it will stop. If two of the point relays are operated simultaneously, or near the same time because of changes in the condition of operation of two equipments has taken place, signals indicating the condition of these two equipments may be transmitted on the same sweep of the selector switch. In such case the signals will be transmitted in a predetermined order depending upon the connection of the equipment to the contacts of the switch, and not depending upon the order in which the changes took place. That is, even if the equipment connected to contact 3 changes its operation before the equipment connected to contact 2, the signal indicating the condition of the equipment connected to contact 2 will be transmitted first.

It may be desired by the operator at the control station to check the indications shown on the control panel. To do this he may operate the scan switch 19 which will cause all the point relays to be set up and the selector switch will stop at each position to indicate the condition of the equipment associated therewith. Operation of the scan switch at the control station will cause operation of the scan relay 37 at the remote station. This will cause the relay contacts 56 and 38 to momentarily change their position. Operation of contact 56 changes the condition of charge of condensers 54, 74, 89 and 91, charging those which may be connected to ground or minus B at their respective condition - indicating switches, and discharging those which may be connected to plub B at their respective condition-indicating switches. This will cause all point relays 50, 70, 85, and 90 to pick up. However, since contact 38 opens the circuit through the winding 106 of the stepping switch, the switch cannot start operation until the scan relay 37 has been released. Releasing the scan relay will again cause charging or discharging currents to flow through relay coils 50, 70, 85, and 90 although this action will be redundant in that they are already picked up. However, reclosing contact 38 will allow the stepping switch to start operation and it will stop at each of the contact points and transmit signals indicating the condition of each piece of equipment. The system will also send the release tones to remove the indication at the control station that equipment has been selected.

Figure 4:
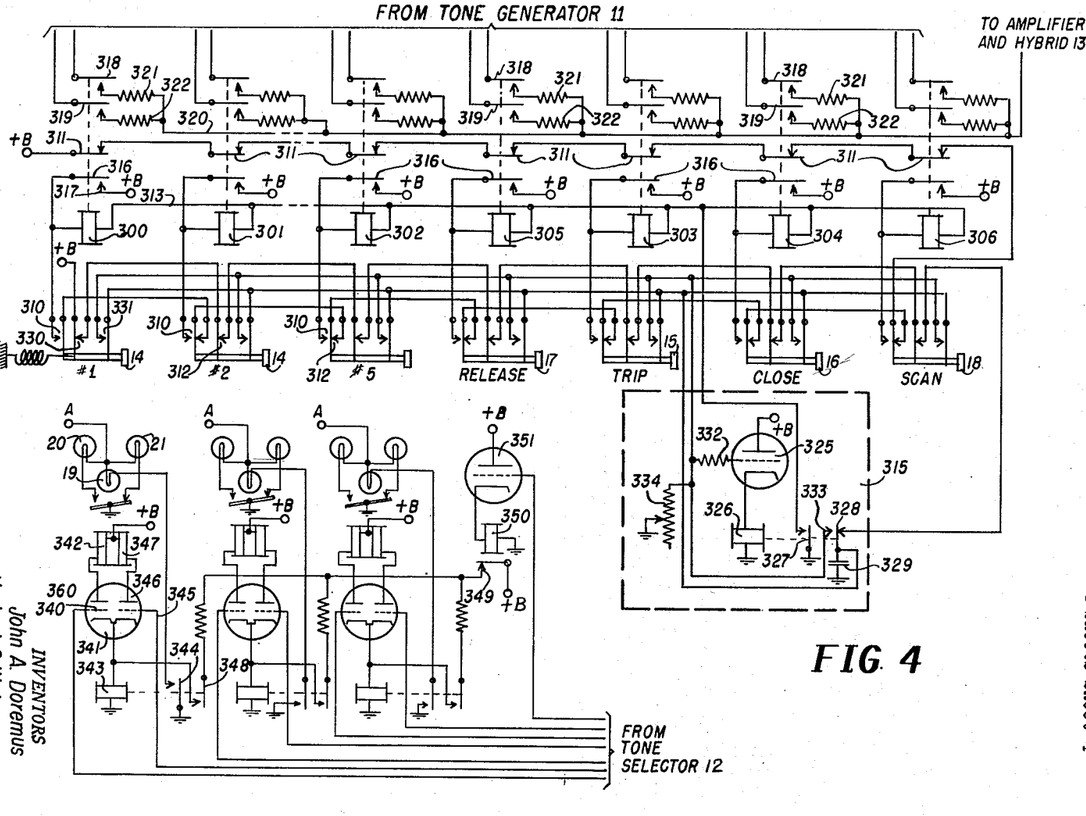
Fig. 4 illustrates modified central station equipment.

In Fig. 4 there is illustrated modified central station equipment which may be used in the system of Fig. 1 instead of the equipment illustrated in Fig. 2. The same reference numerals are used to designate corresponding parts in Figs. 1, 2 and 4. The operating switches and the lamp circuits for only the Nos. 1, 2 and 5 equipments are shown as in Fig. 2. The switches are all spring biased push-button type so that they will return to their normal position and need only to be held in instantaneously for the associated relay to operate as the holding circuit holds the relays operated until the tones are transmitted.

Each of the switches 14, as well as the switches 15 to 18 inclusive, has associated therewith a relay indicated 300—306 respectively. One set of double-throw contacts of each switch and two pairs of contacts on each relay are for connecting the relays in an interlocked manner. Each relay includes a pair of contacts for transmitting tones from the tone generator to the amplifier and hybrid 13 for controlling the remote operations. When a switch 14 is operated (moved to the left) contacts 310 thereof cause operation of the associated relay. The relay is first energized through the series circuit including the contacts 311 of the relays, contacts 312 of the switches to the right of the switch operated, and contact 310 on the switch operated. The other side of the relays may be connected to ground through the conductor 313 which is connected through timer 315 to be described. As the relay is operated the contact 316 thereof engages fixed contact 317 to hold the relay operative. The contacts 311, which are arranged to open after contact 316 engages fixed contact 317, to thereby open the series circuit so that another relay cannot be operated as long as the first relay remains operated. Also, if a push-button is held depressed, the operation of a second push-button will not operate another relay, since contacts 312 on the second switch will open to prevent +B from being applied through contacts 316, 317, of the relay in operation and contact 310 of the switch being held in.

When any one of the relays operates, the contacts 318 and 319 thereof provide connections from the tone generator 11 to the conductor 320 connected to the amplifier and hybrid unit 13. These connections are made through resistors 321 and 322 which provide isolation. After the tones have been transmitted for a predetermined time, the timer 315 operates to break the ground connection so that the energized relay drops out and the transmission of the tones therefore ceases. The contact 318 of the relay will then close again to restore B plus to the relay contacts connected with the various operating switch contacts.

Considering now the timer 315, this timer includes a tube 325 having a relay 326 connected in the cathode lead thereto. The relay 326 includes movable contacts 327 and 328, with the contact 328 providing a circuit for charging the condenser 329 when the relay is not operated. This circuit is completed through the normally closed contacts 330 of each of the switches 14 to 18 inclusive which are connected in series. When a switch is operated, the contacts 331 thereof (all of which are connected in parallel) are closed to connect the condenser 329 directly to the grid of the tube 325 through resistor 332. This causes the tube 325 to conduct and the relay 326 to operate. Operation of the relay 326 causes the contact 327 to close to provide ground for the various relays 300 to 306 inclusive. As the switch 14 will be operated only momentarily, the voltage to the grid of the tube 325 through the contact 331 will be maintained only momentarily. However, when the relay 326 operates, contact 328 engages a back contact 333 which provides an alternative path for application of the voltage from condenser 329 to the grid of the tube 325. In this connection variable resistor 334 is connected in parallel to condenser 329 and serves to discharge this condenser. Therefore the tube 325 will conduct for a predetermined time depending upon the relative values of the condenser 329 and the resistor 334, to hold the ground connection through contact 327 for this specified time only. Should a push-button be held in after the timer relay 326 drops and releases the one of the various relays 300 to 306 inclusive, no relay can again be picked up until the push-button is released to restore B+ connection to the timer through series switch contacts 330 to thereby recharge timer capacitor 329.

It is therefore seen that when any one of the switches 14 to 18 inclusive is operated momentarily, the system will operate to transmit the tones associated therewith for a predetermined time. Also, after any one switch is operated, for the period while the timer holds the relay operative, another relay cannot be rendered operative. There is however no provision for preventing too rapid successive operation of switches in systems that require a guard time between successive tone signals to prevent improper operation of tone selector equipment 23. In such a system it is necessary to use the arrangement shown in Fig. 2 in which the operation of a second switch before the first set of tones have been completely transmitted and a predetermined guard time has passed, will cause the transmission of the release tone so that none of the tones transmitted will be effective to cause an operation at the remote station.

In Fig. 4 there is also shown a system for operation of the indicator lights at the central station, with the lights being designated 19, 20, and 21 as in the previous embodiments. In this system the lights 20 and 21 are operated through a latching relay arrangement as in Fig. 2 so that one or the other of the lamps will always be energized. The voltages from the tone selector 12 are applied to the grids of the tubes with a voltage being applied to the grid 340 of the triode 341 when tones are received by the tone selector indicating that the No. 1 equipment is in tripped condition. This causes the relay 342 to operate so that the armature is moved to the position shown for connecting the lamp 21 to the alternating current source A. The cathode of the triode section 341 is connected to relay 343 to cause this relay to operate when the triode 341 conducts to close contact 344 which energizes the lamp 19. When a tone is received indicating that the equipment No. 1 is in closed position, a voltage will be applied to the grid 345 from the tone selector, which will cause the triode section 346 to be conducting and the relay 347 to operate to move the armature to the alternate position. In such case the lamp 20 will be energized and also lamp 19, as the relay 343 is also in the cathode circuit of the triode 346.

As previously stated, the armature associated with the relays 342 and 347 is always held in one position so that one of the lamps 20 or 21 is always energized. It is desired that the lamp 19 be energized until the release operation takes place. Therefore, a holding circuit is provided for the relay 343 through its contact 348 and through the contact 349 of relay 350 connected in the cathode circuit of triode 351. The contact 349 is normally closed to hold the circuit through the relay 343, and when the release tones are received a voltage is applied from the tone selector to the grid of the triode 351 so that this tube is rendered conducting and the relay 350 operates to open the contact 349 and thereby release relay 343. A single release triode 351 and relay 350 provide holding circuits for all the relays 343. In the system just described there is no arrangement for providing a different indication when the change of condition results from something happening at the remote station rather than from a control initiated at the central station. However, it is obvious that a blinking arrangement or other indication can be provided by the provision of additional contacts on the relays 300 to 306 inclusive, so that one indication is provided when a relay is operated, and a different indication is provided when a change of condition takes place while the relays are all in a released condition.

Various alternative circuit constructions can be provided at the remote station as may be desired in particular application. Instead of operating a number of equipments between two positions such as trip and close, it may be desired to operate a single equipment through a larger number of different operations. In such case, a point relay can be provided for each operation and means such as the reday 145 in Fig. 3 will be not be required to indicate the change between two positions. It will be obvious that other embodiments of this circuit can be provided to best fit particular systems, which embodiments will be obvious to those skilled in the art after a consideration of the foregoing disclosure.

It is apparent from the above that there is provided a supervisory control system which provides control of remote equipment from a central station and which provides a continuous indication at the central station as to the condition of equipment at the remote station. The equipment requires only a single communication channel to provide this operation, although in some applications it may be preferable to provide a separate channel for signals in each direction. The indicating system indicates to the operator first that a desired equipment has been selected so that the operator can check the condition of the equipment to be controlled before actually operating the control. Then after the control is operated a new indication is transmitted indicating that the desired control has actually been effected. This control comes directly from the equipment controlled and indicates the actual operating condition and not merely that some control is provided at the remote station which is intended to produce the desired operation of the equipment.

The system also provides indication of any change in the operating condition of the equipment whether or not this is in response to a control operated at the central station, or by any other means such as automatic operation of a circuit breaker or operation by some condition at the remote station. The operator at the central station can tell by the indication whether the change in condition resulted from a control actuated at the central station. This is particularly advantageous when an operator is not always present at the central station as it would indicate when an equipment changed to a different condition and then changed back while the operator was not observing the control panel. The system can be used to control and supervise a large number of different equipments and includes provisions so that in the event a number of equipments are caused to change their operating condition at the same time or at about the same time, the signals indicating the condition can be transmitted over a single channel by spacing the signals in time. The signals are then transmitted in a given sequence which is independent of the sequence in which the operations took place.

By the use of an interlocking arrangement on the control panel, improper operation of the control is minimized. The panel indicates when the system is busy to further assist the operator. As previously stated the indications on the panel are changed immediately upon any change in the condition of operation and this enables the operator to merely observe the control panel to determine the actual operating condition of all equipment at the remote station. As previously stated the operator can check these indications by causing the system to scan the contacts associated with each equipment so the operator can thereby check the operation of the remotely controlled equipment at will.

The supervisory control system disclosed provides a large number of desired operations and is adaptable to various systems requiring remote supervisory control. Considering the operations performed by the system, the construction thereof is very simple and requires a very small amount of equipment. The entire system is designed so that the operations are not critical and therefore the maintenance required is reduced to a minimum.

It is apparent that the arrangement for storing signals so that a plurality of operations taking place at the same time can be identified by signals transmitted in sequence may be used in other applications than that disclosed. This arrangement can be used, for example, at the central station when it is desired to send control signals from a plurality of spaced panels, and have the signals held separate from each other and transmitted in sequence.

Although one embodiment of the invention has been described which is illustrative thereof, it is obvious that various changes and modifications can be made therein without departing from the intended scope of the invention as defined in the appended claims.

We claim:

1. A system for indicating the operating condition of a plurality of items of equivalent including in combination, a plurality of relays individually associated with said items and operated thereby when with the operating condition of the associated item changes, a source of a plurality of signals having different characteristics, means coupled to said items and to said source for transmitting predetermined ones of said signals to indicate the condition of each of said items, said transmitting means being rendered operative when one of said relays operates and including selector means selectively providing connection with said relays in fixed sequence, said selector means applying signals to said transmitting means when connection is established with operated relays to transmit signals indicating the condition of the item of equipment associated therewith, and means for causing operation of all of said relays whereby signals indicating the condition of all said items are transmitted in sequence.

2. A system for controlling a plurality of items of equipment and indicating the operating condition thereof including in combination, control means individually coupled to said items for selectively controlling the same in response to predetermined control signals, switch means individually associated with said items providing various different connections depending upon the operating condition of the items, a plurality of circuits individually associated with said items and coupled to said control means and to said switch means and each including a relay responsive to operation of either said control means or said switch means of said associated item, a source of a plurality of signals having different characteristics, and transmitting means including a stepping switch having a plurality of levels each with fixed contacts and a movable contact, and having means for moving said movable contacts, said fixed contacts of one level being connected to said relays, said fixed contacts of a second level being connected to said switch means, and said fixed contacts of at least one additional level being connected to said source of signals, a control circuit connected to said movable contact of said first mentioned level of said stepping switch for moving all said movable contacts to positions corresponding to each item of equipment in response to operation of any one of said relays, and including a time-constant network for arresting motion of said movable contacts for a selected interval whenever said movable contact of said first mentioned level engages a fixed contact connected to an operated one of said relays, an output circuit, a second control circuit connected to said movable contact of said second level for controlling the application of signals from said additional level to said output circuit, said output circuit operating to transmit signals from said source corresponding to the condition of each item of equipment when the relay associated with such item is operated.

3. A system for controlling a plurality of items of equipment and indicating the operating condition thereof, including in combination, control means including first relays individually coupled to said items for selecting the same and second relays coupled to said items for controlling the same, a holding circuit for said first relays including a relay for releasing the same, switch means individually associated with said items having different positions depending upon the operating condition of the associated items, a plurality of point relays individually associated with said items and coupled to said first relays and said switch means and responsive to operation thereof, an additional point relay coupled to said relay of said holding circuit and operative when said holding circuit is released, a source of a plurality of signals having different characteristics, a stepping switch including a plurality of levels each having fixed contacts and a movable contact and means for moving said movable contacts, said fixed contacts of a first level being connected to said point relays, said fixed contacts of a second level being connected to said switch means, said fixed contacts of additional levels being connected to said source of signals, and a circuit connected to said movable contact of said first level of said stepping switch and to said moving means therefor for causing said stepping switch to operate sequentially to positions corresponding to each of said point relays when any one of said point relays is operated, said circuit operating to transmit signals identifying the operative condition of any item when the point relay thereof is operated and said stepping switch engages the fixed contacts associated therewith and identifying the release of said equipment when the aforesaid additional point relay is operated.

4. A system for indicating the operating condition of a plurality of items of equipment, including in combination, switch means associated with said items having different positions depending upon the operating condition of the items, a plurality of point relays individually associated with said items and coupled to said switch means and responsive to operation thereof, a source of a plurality of signals having different characteristics, a stepping switch including a plurality of levels each having fixed contacts and a movable contact and means for moving said movable contact, said fixed contacts of a first level being connected to said point relays, said fixed contacts of a second level being connected to said switch means and said fixed contacts of additional levels being connected to said source of signals, a control circuit connected to the movable contact of said first level of said stepping switch and to said moving means therefor for causing said stepping switch to operate when any one of said point relays is operated to provide connection with said point relays in a predetermined sequence, and including a time-constant network for arresting the operation of said stepping switch for a selected interval whenever said movable contact of said first level engages a fixed contact connected to an operated one of said point relays, an output circuit, and a relay having a winding connected to the movable contact of said second level and having contacts connected to the movable contacts of said additional levels and to said circuit for selectively applying tones from said fixed contacts of said additional levels to said output circuit depending upon the positions of said switch means.

5. A system for controlling a plurality of items of equipment and indicating the operating condition thereof, including in combination, control means including first relays individually coupled to said items for selecting the same and second relays coupled to said items for controlling the same, a holding circuit for said first relays including a relay for releasing the same, switch means individually associated with said items having different positions depending upon the operating condition of the associated items, a plurality of point relays individually associated with said items and coupled to said first relays and said switch means and responsive to operation thereof, an additional point relay coupled to said relay of said holding circuit and operative when said holding circuit is released, a source of a plurality of signals having different characteristics, a stepping switch including a plurality of levels each having fixed contacts and a movable contact and means for moving asid movable contacts, said fixed contacts of a first level being connected to said point relays, said fixed contacts of a second level being connected to said switch means, said fixed contacts of additional levels being connected to said source of signals, a control circuit connected to said first level of said movable contact of said stepping switch and to said moving means therefor for causing said stepping switch to operate when any one of said point relays is operated, an output circuit operating to transmit signals identifying the operative condition of any item when the point relay thereof is operated and said stepping switch engages the fixed contacts associated therewith and identifying the release of said equipment when the aforesaid additional point relay is operated, and a second control circuit connected to said point relays for operating all said point relays to cause said output circuit to transmit signals indicating the condition of all said items in sequence.

6. A system for controlling a plurality of items of equipment and indicating the operating condition thereof, including in combination, control means including first relays individually coupled to said items for selecting the same and second relays coupled to said items for controlling the same, a holding circuit for said first relays including a relay for releasing the same, switch means associated with said items having various different positions depending upon the operating condition of the associated item, a plurality of point relays individually associated with said items and coupled to said first relays and said switch means and responsive to operation thereof, an additional point relay coupled to said relay of said holding circuit and operative when said holding circuit is released, a source of a plurality of signals having different characteristics, and selector means rendered operative when any one of said point relays is operated to provide operative connection with said point relays in a predetermined sequence, said selector means being coupled to said switches and to said signal source and operating to transmit identifying signals when said selector means is operatively connected to a point relay which is operated.

7. A system for controlling a plurality of items of equipment and indicating the operating condition thereof including in combination, control means individually coupled to said items for selectively controlling the same in response to predetermined control signals, switch means individually associated with said items providing various different connections depending upon the operating condition of the items, a plurality of circuits individually associated with said items and coupled to said control means and to said switch means and including relays responsive to operation of either said control means or said switch means, a source of a plurality of signals having different characteristics, and transmitting means rendered operative when any one of said relays is operated and including a selector switch providing operative connection with said circuits in a predetermined sequence, said selector switch having contacts coupled to said switch means and to said signal source and operating to transmit signals corresponding to the operative condition of each item of equipment when said selector means is operatively connected to the circuit associated therewith and said relay thereof is operated, and means causing operation of all of said relays whereby signals indicating the condition of all of said items are transmitted in sequence.

8. A system for controlling equipment at a remote station from a central station, and for indicating at said central station the condition of said equipment at said remote station, including in combination, selective means at said central station for transmitting to said remote station first signals including frequency components individually associated with said items of equipment for individually selecting said items, control means at said central station for transmitting second signals including frequency components individually associated with various conditions of said items of equipment for operating the selected item, control means at said remote station individually connected to said items of equipment, and transmitting means at said remote station controlled by said control means for transmitting to said central station signals including frequency components indicating the condition of said items of equipment, said transmitting means including means rendered responsive each time an item is selected and each time an item changes its operating condition to transmit a signal indicating the condition of such item.

9. A supervisory control system comprising a central station and a remote station, said central station including in combination; means for generating a plurality of selecting signals each having different characteristics; an output circuit for transmitting said selecting signals to said remote station; and a plurality of manually operated control circuits, each of said control circuits upon actuation applying a different one of said selecting signals to said output circuit; said remote station including in combination; a plurality of items of equipment to be individually selected by said selecting signals; signal separator means for applying each of said selecting signals to a different one of said items; generating means for producing a plurality of indicating signals each having different characteristics; an output circuit for transmitting said indicating signals to said central station; a selector mechanism for sequentially applying said indicating signals to said last mentioned output circuit; a plurality of point relays respectively associated with said items, each of said point relays being operated in response to the selection of its associated item by one of said selecting signals from said central station and also being operated in response to a change in the operating condition of its associated item, the operation of any of said point relays actuating said selector mechanism and causing it sequentially to supply to said last mentioned output circuit indicating signals corresponding to each operated one of said point relays.

10. A supervisory control system comprising a central station and a remote station, said central station including in combination: means for generating a plurality of selecting signals and at least one control signal each having different characteristics; an output circuit for transmitting said seleciing signals and said control signal to said remote station; a plurality of manually operated control circuits, each of said control circuits upon actuation applying a different one of said selecting signals to said output circuit; and a further manually operated control circuit for applying said control signal to said output circuit; said remote station including in combination: a plurality of items of equipment to be individually selected by said selecting signals; control means responsive to an applied signal for operating any of said items selected by said selecting signal; signal separator means for applying each of said selecting signals to a different one of said items, and for applying said control signal to said control means; generating means for producing a plurality of indicating signals each having different characteristics; an output circuit for transmitting said indicating signals to said central station; a selector mechanism for sequentially applying said indicating signals to said last mentioned output circuit; a plurality of point relays respectively associated with said items, each of said point relays being operated in response to the selection of its associated item by one of said selecting signals from said central station and also being operated in response to a change in the operating condition of its associated item, the operation of any of said point relays actuating said selector mechanism and causing it sequentially to supply to said last mentioned output circuit indicating signals corresponding to each operated one of said point relays.

11. A supervisory control system comprising a central station and a remote station, said central station including in combination; means for generating a plurality of selecting signals and a release signal each having different characteristics; an output circuit for transmitting said selecting signals and said release signal to said remote station; a plurality of manually operated control circuits, each of said control circuits upon actuation applying a different one of said selecting signals to said output circuit; and a further manually operated control circuit for applying said release signals to said output circuit; said remote station including in combination; a plurality of items of equipment to be individually selected by said selecting signals; release means responsive to an applied signal for releasing any one of said items selected by said selecting signals; signal separator means for applying each of said selecting signals to a different one of said items, and for applying said release signal to said release means; generating means for producing a plurality of indicating signals each having different characteristics; an output circuit for transmitting said indicating signals to said central station; a selector mechanism for sequentially applying said indicating signals to said last mentioned output circuit; a plurality of point relays respectively associated with said items, each of said point relays being operated in response to the selection of its associated item by one of said selecting signals from said central station and also being operated in response to a change in the operating condition of its associated item; and a further point relay operated in response to actuation of said release means by said release signal, the operation of said point relays actuating said selector mechanism and causing it sequentially to supply to said last last mentioned output circuit indicating signals corresponding to each operated one of said point relays.

12. A supervisory control system comprising a central station and a remote station, said central station including in combination; means for generating a plurality of selecting signals each having different characteristics; an output circuit for transmitting said selecting signals to said remote station; and a plurality of manually operated control circuits, each of said control circuits upon actuation applying a different one of said selecting signals to said output circuit; said remote station including in combination: a plurality of items of equipment to be individually selected by said selecting signals; signal separator means for applying each of said selecting signals to a different one of said items; generating means for producing a plurality of indicating signals each having different characteristics; an output circuit for transmitting said indicating signals to said central station; a selector mechanism for sequentially applying a first series of said indicating signals to said last mentioned output circuit and for sequentially deriving a second series of said indicating signals concurrently with said first series; a plurality of point relays respectively associated with said items, each of said point relays being operated in response to the selection of its associated item by one of said selecting signals from said central station and also being operated in response to a change in the operating condition of its associated item, the operation of any one of said point relays actuating said selector mechanism and causing it sequentially to supply to said last mentioned output circuit indicating signals from said first series corresponding to each operated one of said point relays; and circuit means responsive to the operating condition of each of said items of equipment for causing said selector to supply indicating signals from said second series to said output circuit representing the operating condition of the items of equipment respectively associated with each operated one of said point relays.

13. A supervisory control system comprising a central station and a remote station, said central station including in combination; means for generating a scanning signal; an output circuit for transmitting said scanning signal to said remote station; and a manually operated control circuit for applying said scanning signal to said output circuit; said remote station including in combination: a plurality of items of equipment to be controlled from said central station; generating means for producing a plurality of indicating signals each having different characteristics; an output circuit for transmitting said indicating signals to said central station; a selector mecha- nism for sequentially applying a first series of said indicating signals respectively representing said items of equipment to said last mentioned output circuit and for sequentially deriving a second series of said indicating signals concurrently with said first series; a plurality of point relays respectively associated with said items, each of said point relays being operated in response to said scanning signal, the operation of said point relays actuating said selector mechanism and causing it sequentially to supply said first series of indicating signals to said last mentioned output circuit; and circuit means responsive to the operating condition of each of said items of equipment for causing said selector to supply indicating signals from said second series to said output circuit concurrently with the signals of said first series and respectively indicating the operating condition of each of said items.

14. A system for indicating the operating condition of a plurality of items of equipment including in combination, a plurality of point relays individually associated with said items and operated when the operating condition of the associated item changes, generating means for producing a plurality of indicating signals each having different characteristics, an output circuit, a selector mechanism for sequentially deriving indicating signals from said generating means respectively representing the operating condition of each of said items, a first control circuit for actuating said selector whenever one of said point relays is operated, and a second control circuit for causing said selector to supply sequentially to said output circuit only such indicating signals corresponding to the aforesaid items whose associated point relays are operated.

15. A system for indicating the operating condition of a plurality of items of equipment including in combination, a plurality of point relays individually associated with said items and operated when the operating conditions of the associated item changes, generating means for producing a plurality of indicating signals each having different characteristics, an output circuit, a selector mechanism for sequentially deriving indicating signals from said generating means respectively representing the operating condition of each of said items, a control circuit for actuating said selector whenever one of said point relays is operated, and a time-constant network included in said control circuit for causing said selector to supply sequentially to said output circuit only such indicating signals corresponding to the aforesaid items whose associated point relays are operated.

16. A central station for controlling equipment at a remote station including in combination: generating means for developing a release signal of distinctive characteristics; an output circuit including a first time-constant network, and including a first relay means for impressing the release signal on an output terminal for transmission to the remote station; a control circuit including a second time-constant network, and including second relay means for impressing said release signal on said output circuit; and a manually operated control for energizing said first relay means to complete a connection from said control circuit to said output terminal, for completing an energizing circuit for said second relay means thereby to complete a connection from said generating means to said output terminal, to break an energizing circuit to said first time-constant network, and to make an energizing circuit to said second time-constant network; said first relay means remaining energized for a selected time interval determined by said first time-constant network and said second relay means remaining enerized for a selected time interval after said first mentioned time interval determined by said second time-constant network.

17. A central station for controlling equipment at a remote station including in combination: generating means for developing a release signal of distinctive characteristics and for developing a plurality of control signals, also of individual distinctive characteristics; an output circuit including a first time-constant network, and including a first relay means for impressing the release signal and control signals on an output terminal for transmission to the remote station; a control circuit including a second time-constant network, and including second relay means for impressing said release signal on said output circuit; and a manually operated release control for energizing said first relay means so as to complete a connection from said control circuit to said output terminal, so as to complete an energizing circuit for said second relay means thereby to supply said release signal to said output terminal and interrupt the application of said control signals to said output terminal, so as to break an energizing circuit to said first time-constant network, and so as to make an energizing circuit to said secondn time-constant network; said first relay means remaining energized for a selected time interval determined by said first time-constant network and said second relay means remaining energized for a selected time interval after said first mentioned time interval determined by said second time-constant network.

18. A central station for controlling equipment at a remote station including in combination: generating means for developing a release signal of distinctive characteristics and for developing at least one control signal also of distinctive characteristics; an output circuit including a first time-constant network, and including a first relay means for impressing signals applied to said output circuit on an output terminal for transmission to the remote station; a control circuit including a second time-constant network, and including second relay means for impressing said release signal on said output circuit and for interrupting the application of said control signal on said output circuit; and a manually operated control for establishing a connection from said generating means to said control circuit to supply said control signal to said control circuit and for energizing said first relay means so as to complete a connection from said control circuit to said output terminal; said first relay means remaining energized for a selected time interval determined by said first time-constant network, and then causing said second relay means to be energized for a further selected time interval determined by said second time-constant network to interrupt the application of said control signal to said output circuit and apply said release signal to said output circuit.

19. A remote station having at least one item of equipment to be controlled by a central station, said remote station including in combination: an actuating device for the aforesaid item including a trip coil and a close coil; a control relay for said actuating device responsive to a first signal from the aforesaid central station for establishing an energizing connection to one end of each of said coils of said actuating device; a trip relay responsive to a second signal from said central station for completing an energizing connection to the other end of said trip coil; a close relay responsive to the third signal from said central station for completing an energizing connection to the other end of said close coil; generating means for developing a plurality of indicating signals; a selector mechanism for selecting a first indicating signal having distinctive characteristics representing the aforesaid item, and for selecting second and third indicating signals having distinctive characteristics respectively representing an open and closed condition of said item; a point relay responsive to said first signal from said central station and to a change in condition of said item for actuating said selector to select the aforesaid indicating signals; an output circuit for transmitting said indicating signals to the central station; circuit means for applying said first indicating signal to said output circuit upon activation of said selector by said point relay; and a relay included in said last-mentioned circuit means responsive to the condition of said item for supplying a selected one of said second and third indicating signals to said output circuit.

20. A remote station having at least one item of equipment to be controlled by a central station, said remote station including in combination: generating means for developing a plurality of indicating signals; a selector mechanism for selecting a first indicating signal having distinctive characteristics representing the aforesaid item, and for selecting second and third indicating signals having distinctive characteristics respectively representing an open and closed condition of said item; a point relay responsive to a change in condition of said item for actuating said selector to select the aforesaid indicating signals; an output circuit for transmitting said indicating signals to the central station; circuit means for applying said first indicating signal to said output circuit upon actuation of said selector by said point relay; and a relay included in said last mentioned circuit means responsive to the condition of said item for supplying a selected one of said second and third indicating signals to said output circuit.

JOHN A. DOREMUS.
HERBERT C. WATERMAN.

References Cited in the file of this patent

UNITED STATES PATENTS

| Number | Name | Date |
|---|---|---|
| 1,674,127 | Bellamy | June 19, 1928 |
| 1,714,973 | White | May 28, 1929 |
| 1,763,879 | Burns | June 17, 1930 |
| 1,786,805 | Wensley | Dec. 30, 1930 |
| 1,790,188 | White | Jan. 27, 1931 |
| 1,790,866 | Hudd | Feb. 3, 1931 |
| 2,059,896 | Oliver | Nov. 3, 1936 |
| 2,280,144 | Derr | Apr. 21, 1942 |
| 2,298,907 | Stewart | Oct. 13, 1942 |
| 2,408,037 | Bowsher | Sept. 24, 1946 |
| 2,444,243 | Breese | June 29, 1948 |
| 2,543,869 | Rees | Mar. 6, 1951 |
| 2,616,959 | Breese | Nov. 4, 1952 |